United States Patent
Fei

(10) Patent No.: US 6,175,209 B1
(45) Date of Patent: Jan. 16, 2001

(54) 2/4-POLE PSC MOTOR WITH SHARED MAIN WINDING AND SHARED AUXILIARY WINDING

(75) Inventor: Renyan William Fei, St. Louis, MO (US)

(73) Assignee: Emerson Electric Co., St. Louis, MO (US)

(*) Notice: Under 35 U.S.C. 154(b), the term of this patent shall be extended for 0 days.

(21) Appl. No.: 09/349,311

(22) Filed: Jul. 8, 1999

(51) Int. Cl.$^7$ .................................. H02P 7/48; H02K 3/00
(52) U.S. Cl. .......................... 318/776; 318/775; 318/777; 310/179; 310/180
(58) Field of Search ..................... 318/766, 775, 318/776, 777, 786, 789, 773; 310/179, 180

(56) References Cited

U.S. PATENT DOCUMENTS

| | | |
|---|---|---|
| 1,795,063 | 3/1931 | Weichsel . |
| 1,859,368 | 5/1932 | Kennedy . |
| 1,859,369 | 5/1932 | Kennedy . |
| 2,728,038 * | 12/1955 | Koch .................................. 318/776 |
| 2,813,239 | 11/1957 | Cour .................................. 318/221 |
| 2,896,144 | 7/1959 | Mollenberg ........................ 318/224 |
| 2,946,941 * | 7/1960 | Jin .................................... 318/776 |
| 3,619,730 | 11/1971 | Broadway ...................... 318/224 R |
| 3,826,960 | 7/1974 | Broadway et al. ................. 318/223 |
| 4,103,212 | 7/1978 | Spradling ........................ 318/224 A |
| 4,103,213 | 7/1978 | Landgraf .......................... 318/224 A |
| 4,322,665 | 3/1982 | Landgraf ............................. 318/774 |
| 4,463,303 * | 7/1984 | Kirschbaum ....................... 318/776 |
| 4,473,788 * | 9/1984 | Kirschbaum ....................... 318/776 |
| 4,476,422 * | 10/1984 | Kirschbaum ....................... 318/776 |
| 4,947,098 * | 8/1990 | Vlasak .............................. 318/775 |
| 5,075,611 * | 12/1991 | Ankele .............................. 318/754 |
| 5,103,153 * | 4/1992 | Droho ............................... 318/777 |
| 5,451,854 * | 9/1995 | Uuskoski .......................... 318/778 |
| 5,825,111 * | 10/1998 | Fei ................................... 310/179 |

OTHER PUBLICATIONS

Fei et al., "Design and Test Analysis of Single–Phase Induction Motors with 4–8 Pole Common Winding," IEEE Transactions on Industry Applications, vol. 31, No. 6, Nov./Dec. 1995, pp. 1–5.

* cited by examiner

*Primary Examiner*—Paul Ip
(74) *Attorney, Agent, or Firm*—Senniger, Powers, Leavitt & Roedel

(57) ABSTRACT

A motor comprising a 2/4-pole permanent-split capacitor motor having a shared main winding and a shared auxiliary winding. The shared auxiliary winding comprises a 4-pole auxiliary winding phase shifted one slot less than a phase shift of 90 degrees with respect to the 4-pole main winding. A switching circuit selectively simultaneously energizes the shared main winding and the shared auxiliary winding in the 2-pole and 4-pole configurations.

18 Claims, 5 Drawing Sheets

2/4-POLE PSC MOTOR WITH SHARED MAIN WINDING AND SHARED AUXILIARY WINDING

BACKGROUND OF THE INVENTION

1. Field of the Invention

The invention generally relates to permanent-split capacitor motors and, in particular, to a 2-pole/4-pole motor having a shared main winding and a shared auxiliary winding between the 2-pole configuration and the 4-pole configuration.

2. Description of the Prior Art

PSC motors, as one kind of single-phase induction motors, come in various multiple configurations and various pole configurations. One common configuration is a 2-pole/4-pole motor which operates at about 3,600 rpm at 60 Hz in the 2-pole configuration and which operates at about 1,800 rpm at 60 Hz in the 4-pole configuration. Such motors are often used as part of a hermetically sealed compressor to drive the compressor at two speeds, both a low speed and a high speed, to provide efficient compressor operation.

Within the limited space of the compressor, to provide the highest motor efficiency for a certain output power, one needs to make the best use of the active material, i.e., copper and steel. Sharing windings between 2-pole and 4-pole configurations is an important approach to achieve this. However, in the past, it has been believed that 2-pole/4-pole PSC motors can only share a main winding between the 2-pole and 4-pole configurations. It was believed that 2-pole/4-pole motors could not share both the main and auxiliary winding at the same time because it could not keep the phase shift between the main and auxiliary windings equal to 90° for both the 2-pole and 4-pole configurations. In particular, if both main and auxiliary windings are shared and the auxiliary winding has 90° phase shift with the main winding in the 2-pole mode, the phase shift in 4-pole mode becomes 180°. If the auxiliary winding has a 90° phase shift with the main winding in the 4-pole mode, the phase shift in 2-pole becomes 45°. When a phase shift between the main and auxiliary windings is equal to 180°, the motor cannot start. When a phase shift is equal to 45°, the motor performance is generally poor. Therefore, the prior art has generally employed a separate auxiliary winding in each configuration for a PSC motor having 2-pole and 4-pole operating modes or configurations, to keep the phase shifts between the main and auxiliary windings both equal to 90°.

Therefore, there is a need for a 2-pole/4-pole PSC single phase motor with a shared main winding which also has a shared auxiliary winding.

SUMMARY OF THE INVENTION

To share both main and auxiliary windings for 2-pole and 4-pole modes, the invention employs a new winding configuration. In this new configuration, after a simple reconnection, the 2-pole mode has 125° phase shift and the 4-pole mode has 70° phase shift for a 36-slot stator. Both 2-pole and 4-pole modes achieve very good performance with these phase shifts. According to the prior art, the best phase shift between the main and auxiliary windings is a little more than 90°, e.g., about 105°. Therefore, as compared with 90°, both 70° and 125° result in a slightly reduced performance in certain respects. However, since the auxiliary winding has been shared, for the same material cost, the overall performance of this 2-pole and 4-pole motor is substantially better than the design based on the prior art.

It is an object of this invention to provide a 2-pole/4-pole PSC motor having a shared main winding and a shared auxiliary winding; such a motor which has a reduced winding material requirement so that the cost of manufacturing the motor is reduced; such a motor which has efficient operation; such a motor which can be manufactured without significant retooling or redesign; such a motor which employs a single capacitor for both the 2-pole and 4-pole configurations.

In one form, the invention is a motor comprising: a stator core; a rotor in rotational relationship with the stator core; a shared main winding on the core having 2-pole and 4-pole configurations; a shared auxiliary winding on the core having 2-pole and 4-pole configurations; and a switching circuit for selectively simultaneously energizing the shared main winding and the shared auxiliary winding in 2-pole and 4-pole configurations.

In another form, the invention is a motor having a 2-pole configuration and a 4-pole configuration and comprising a stator core; a rotor in rotational relationship with the stator core; a shared main winding on the core; a shared auxiliary winding on the core; and a switching circuit. The shared main winding, when energized in the 2-pole configuration, generates a first main magnetic field and, when energized in the 4-pole configuration, generates a second main magnetic field different from the first main magnetic field. The shared auxiliary winding on the core, when energized in the 2-pole configuration, generates a first auxiliary magnetic field and, when energized in the 4-pole configuration, generates a second auxiliary magnetic field different from the first auxiliary magnetic field. The switching circuit selectively energizes the shared main winding and the shared auxiliary winding in the 2-pole configuration and selectively energizes the shared main winding and the shared auxiliary winding in the 4-pole configuration.

The invention also includes a method of making a motor comprising the steps of:

providing a stator core;

providing a rotor in rotational relationship with the stator core;

winding a shared main winding on the core having 2-pole and 4-pole configurations; and winding a shared auxiliary winding on the core having 2-pole and 4-pole configurations.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
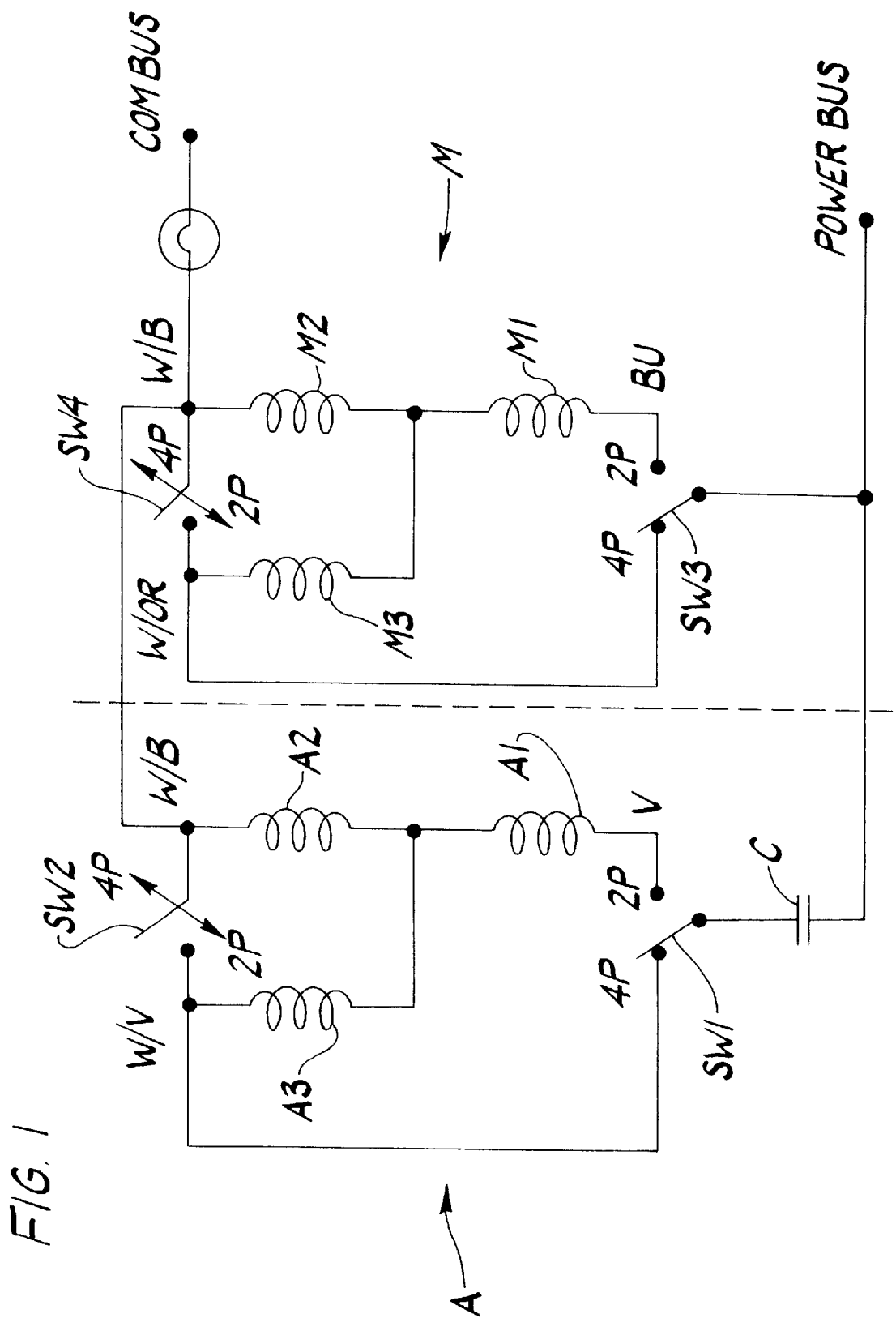
FIG. 1 is a schematic diagram of the electrical circuit of one preferred embodiment of the motor according to the invention illustrating the shared main and auxiliary windings and their interconnection.

Referring to FIG. 1, illustrated is a schematic diagram of the electrical circuit of one preferred embodiment of a 2-pole/4-pole permanent-split capacitor single phase induction motor according to the invention. In particular, FIG. 1 illustrates the shared main windings generally referred to by reference character M and the shared auxiliary windings generally referred to by reference character A and their interconnection. As shown in FIG. 1, the auxiliary windings are generally on the left side of the schematic and the main windings are on the right side of the schematic. This motor has a 2-pole configuration which includes main windings M1, M2, and M3 and auxiliary windings A1, A2, and A3. This motor also has a 4-pole configuration which includes main windings M2 and M3 and auxiliary windings A2 and A3. Therefore, main windings M2 and M3 are shared between the 2-pole and 4-pole configurations and auxiliary windings A2 and A3 are shared between the 2-pole and 4-pole configurations.

There are four switches SW1, SW2, SW3, and SW4, each of which has a 2-pole position 2P and a 4-pole position 4P which connect the windings in the 2-pole configuration or in the 4-pole configuration. FIG. 1 illustrates the switches in their 4-pole (4P) positions. In this 4-pole configuration, the single capacitor C is connected in series through switch SW1 to auxiliary winding A3 which is in series with auxiliary winding A2 which is then connected to the common bus. In the 4-pole configuration, switch SW3 connects main winding M3 to the power bus with M3 being in series with main winding M2 which is connected to the common bus. Switches SW2 and SW4 are open circuited in the 4-pole configuration so that A2, A3, M2 and M3 are simultaneously energized to create a rotating magnetic field to rotate the rotor. In the 2-pole configuration, the switches would be in their 2P positions which is opposite the positions illustrated in FIG. 1. In the 2-pole configuration, capacitor C is connected in series with auxiliary winding A1 which is connected in series with the parallel combination of auxiliary windings A2 and A3 which combination is connected to the common bus. In the 2-pole configuration, switch SW2 is closed circuited to connect windings A2 and A3 in parallel. In the 2-pole configuration, winding M1 is connected in series through switch SW3 to the power bus and is connected to the parallel combination of main windings M2 and M3 which combination is connected to the common bus. In the 2-pole configuration, switch SW4 is close circuited to connect windings M2 and M3 in parallel so that A1, A2, A3, M1, M2 and M3 are simultaneously energized to create a rotating magnetic field to rotate the rotor.

In general, it was believed that a 90° phase shift of the auxiliary winding with respect to the main winding provided the most efficient operation. However, it has been shown that a phase shift of greater than 90° and approximately 105° results in a better overall performance in a 2-pole/4-pole PSC motor. A phase shift of greater than 105° tends to result in reduced performance.

Figure 2:
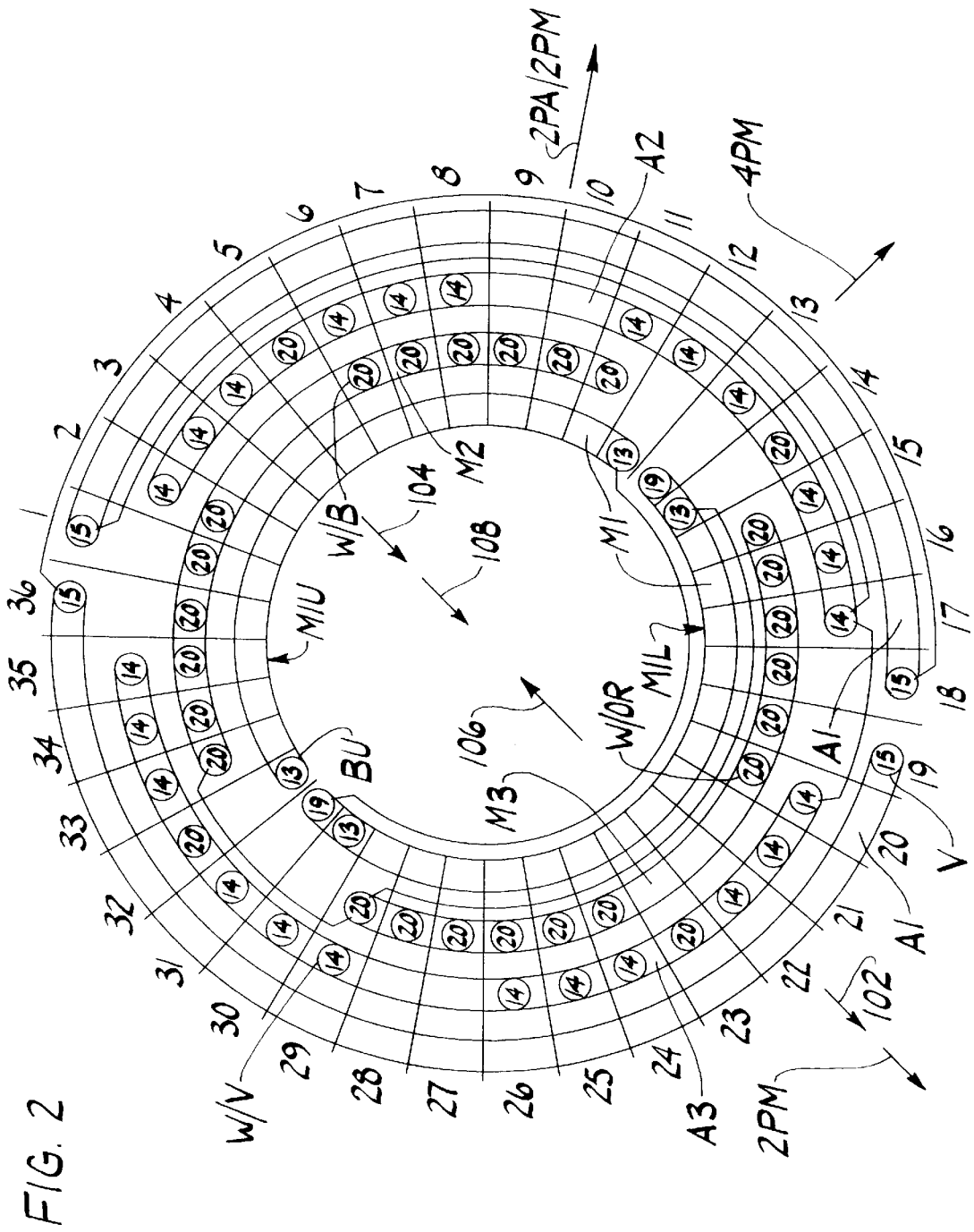
FIG. 2 is a diagrammatic view of the winding distribution of one preferred embodiment of the motor according to the invention.

FIG. 2 is a diagrammatic view of the winding distribution of one preferred embodiment of the motor according to the invention wherein the 4-pole auxiliary winding has been shifted by one slot less than a 90° shift.

In the example illustrated in FIG. 2, for a 36 slot, 2-pole/4-pole PSC motor, the 4-pole auxiliary winding A2, A3 has been shifted clockwise by one slot from a 90° phase shift resulting in a 125° phase shift with respect to the 2-pole main winding M1 and a 70° phase shift with regard to the 4-pole main winding M2, M3. It is also contemplated that the 4-pole auxiliary winding may be shifted by two slots, although such a two slot shift would tend to be less efficient than the one slot shift. This is because the two slot shift of the 4-pole auxiliary winding would have 115° phase shift with respect to the 2-pole main winding and a 50° phase shift with respect to the 4-pole main winding. The phase shifts and their effects are described below in greater detail.

If the 4-pole auxiliary winding for a 36 slot, 2-pole/4-pole PSC motor is shifted to one slot less than a 90° shift, as illustrated in FIG. 2, the phase shift between the two neighboring poles becomes either 70° or 110° with respect to the 4-pole main winding. This one slot shift of 70° in the 4-pole configuration becomes a phase shift of 35° in the 2-pole configuration. Alternatively, a one slot shift of 110° in the 4-pole configuration becomes a 55° phase shift in the 2-pole configuration. In the 2-pole configuration, if the phase shift between neighboring poles is 55°, then the phase shift between the other poles is 125°. For this reason, when shifting the 4-pole auxiliary winding one slot less than a 90° shift, this results in the 4-pole auxiliary winding having a 70° phase shift with respect to the 4-pole main winding and a 125° phase shift with respect to the 2-pole main winding.

Similarly, if a 4-pole auxiliary winding, which is usually in a 90° phase shift with respect to the 4-pole main winding, is shifted by two slots less than a 90° shift, the phase shift between the two neighboring poles becomes either 50° or 130° with respect to the 4-pole main winding. When comparing the 4-pole auxiliary winding shifted by two slots to the 2-pole main winding, a 50° phase shift in the 4-pole configuration becomes a 25° phase shift in the 2-pole configuration and 130° phase shift in the 4-pole configuration becomes a 65° phase shift in the 2-pole configuration. For the 2-pole configuration, if the phase shift between the neighboring poles is 65°, then the phase shift between the other poles is 115°. Therefore, when the 4-pole auxiliary winding, which is normally out of phase by 90° with respect to the 4-pole main winding is shifted to two slots less than a 90° shift, this results in a phase shift of 50° between the 4-pole auxiliary winding and the 4-pole main winding and further results in a phase shift of 115° between the 4-pole auxiliary winding and the 2-pole main winding.

Overall, in terms of performance, a phase shift of 115° when the auxiliary is shifted by two slots provides a slightly better phase shift than the phase shift of 125° when the auxiliary is shifted by one slot. However, a phase shift of 50° in the 4-pole configuration for the two slot shift provides a less efficient operation than a phase shift of 70° in the 4-pole configuration so that the one slot shift is preferred over the two slot shift.

One advantage of sharing the auxiliary winding is that it reduces the amount of material required for the auxiliary winding and for the motor as a whole as compared to previous designs which used a 2-pole auxiliary winding which was separate from and independent of the 4-pole auxiliary winding.

The one slot shift in the 4-pole auxiliary winding, which allows the auxiliary winding to be shared in both the 2-pole and 4-pole configurations, also provides some advantages with regard to the need for capacitance. One advantage of the single slot shift of the 4-pole auxiliary winding is that it increases from 90° to 125° the phase shift of the 2-pole auxiliary winding with respect to the 2-pole main winding. This means that less capacitance (a smaller capacitor C) is needed to operate the motor in the 2-pole configuration. On the other hand, by shifting the 4-pole auxiliary winding one slot the phase shift between the 4-pole auxiliary winding with respect to the 4-pole main winding is decreased from 90° to 70°. This suggests that slightly more capacitance is needed for operation in the 4-pole configuration.

However, the operation of the motor in the 2-pole configuration with a 90° auxiliary winding shift requires more capacitance than the operation of the motor in the 4-pole configuration with a 90° shift, so that the overall effect of the one slot shift of the 4-pole auxiliary winding used as a shared auxiliary is the ability to use a single capacitor in both the 2-pole and 4-pole configurations.

Figure 3:
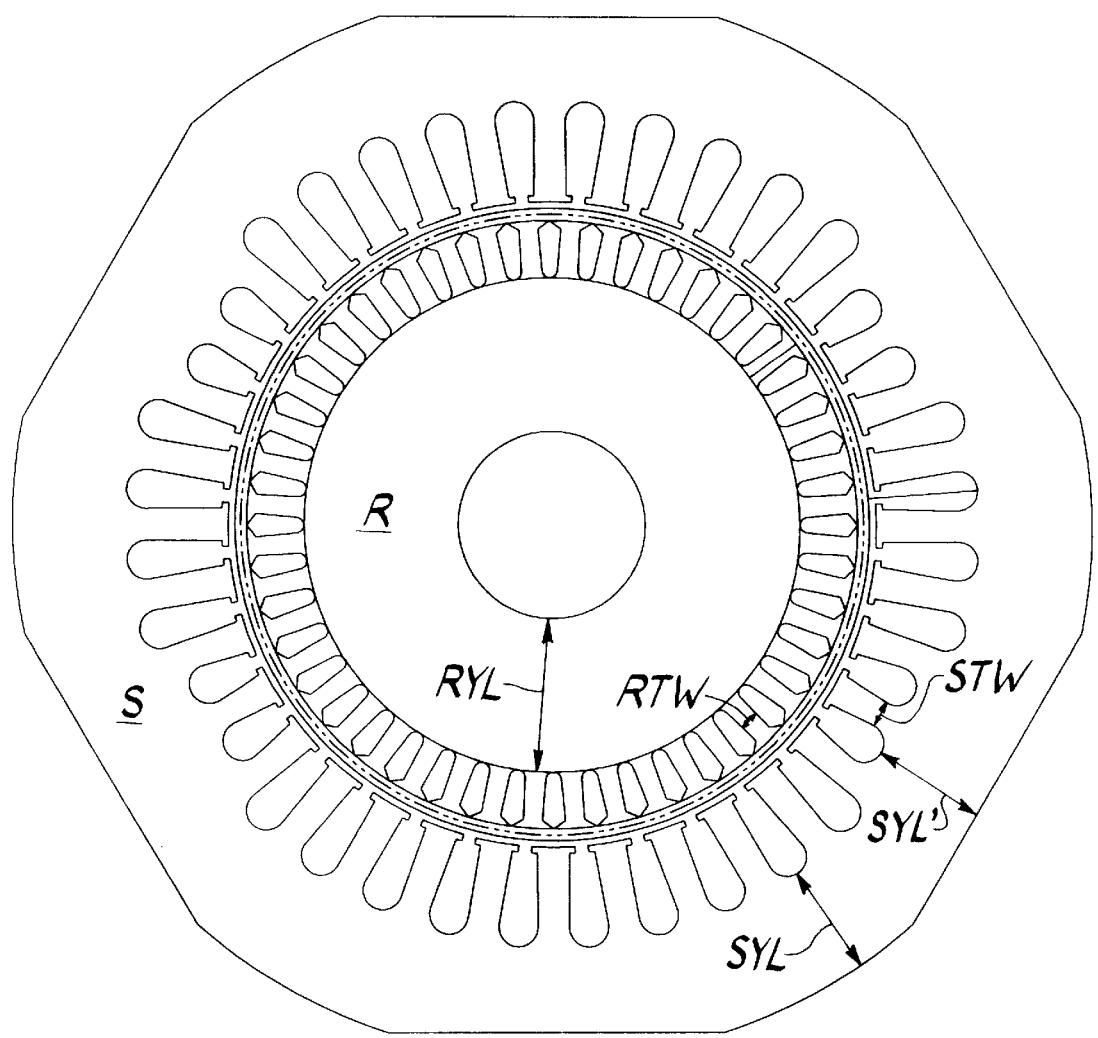
FIG. 3 is a cross sectional plan view taken along a plane perpendicular to the axis of rotation of one preferred embodiment of the rotor and stator of the motor according to the invention.

In some testing, it has been found that the one slot shift provides a motor having an efficiency up to 86% in operation in the 4-pole configuration and up to 88% efficiency in operation in the 2-pole configuration. This high efficiency is achieved in part, by designing the 36 slot stator lamination and the 44 slot rotor lamination as illustrated in FIG. 3. To achieve rational flux distributions in different parts of the stator and rotor for both 2-pole and 4-pole modes, the stator yoke length SYL, the stator tooth width STW, the rotor yoke length RYL, and the rotor tooth width RTW were carefully chosen, for example, as follows: stator short-slot yoke length (SYL')=0.825"; stator yoke length (SYL)=0.755"; stator tooth width (STW)=0.19"; rotor yoke length (RYL)=0.984"; and rotor tooth width (RTW)=0.123", for a rotor having a diameter of 4.055" and for a stator having a maximum diameter of 7.04" and having a flat diameter of 6.75". In particular, 8 of 36 slots of the stator lamination are short-slots made smaller for a better slot-fill distribution and for a longer stator yoke which provides better performance in the 2-pole operation.

For the 4-pole configuration, main windings M2 and M3 are in series and become the north/north pole referred to as a consequent winding. The reason that main winding M1 is used in the 2-pole configuration is that main windings M2 and M3 are in parallel in the 2-pole configuration which result in a half turn effect of these windings. In the 2-pole configuration, more turns are needed so that the main winding M1 is added in the 2-pole configuration to provide the additional turns. The added turns due to the addition of main winding M1 in the 2-pole configuration means more effective turns which means less flux density under winding voltages. This also means less winding harmonics which is important to the starting performance of the motor.

Referring again to FIG. 2, the assumed direction of the magnetic fields generated by the various windings will be discussed. When the current flows from the power bus to the common bus, the direction of the magnetic field generated by the lower portion $M1_L$ of main winding M1 and by main winding M3 in the 2-pole configuration is indicated by arrow 102. The direction of the magnetic field generated by the upper portion $M1_U$ of the main winding M1 and by main winding M2 in the 2-pole configuration is indicated by arrow 104, which is parallel to and coaxial with arrow 102. As a result, the field generated by all main windings in the 2-pole configuration are aligned so that arrow 2PM illustrates the field as a whole in the 2-pole configuration.

In contrast, the direction of the magnetic field generated by main winding M3 in the 4-pole configuration is referred to by arrow 106 whereas the direction of the magnetic field generated by main winding M2 in the 4-pole configuration is referred to by opposing arrow 108. As a result, the fields from all main windings in the 4-pole configuration are opposite each other creating the north/north consequent winding mentioned above. The field as a whole generated by all main windings in the 4-pole configuration is generally referred to by arrow 4PM. The direction of the field as a whole generated by the shared auxiliary winding in both the 2-pole configuration and the 4-pole configuration is the same and is illustrated by the arrow labeled 2PA/4PA.

From the 2-pole main field 2PM to the 2-pole auxiliary field 2PA, the fields as a whole have a difference in direction of 12.5 slots which is 125°. From the 4-pole main field 4PM to the 4-pole auxiliary field 4PA, the fields as a whole have a difference in direction of 3.5 slots which is 70°. This provides acceptable overall performance for operation in the 2-pole configuration and operation in the 4-pole configuration. In other words, a shift of one slot of the 4-pole auxiliary winding from its 90° phase shift position results in a 20° reduction in the auxiliary phase shift with respect to the 4-pole main winding from 90° to 70° and results in a 35° increase in the auxiliary phase shift with respect to the 2-pole main winding from 90° to 125°.

Figure 4:
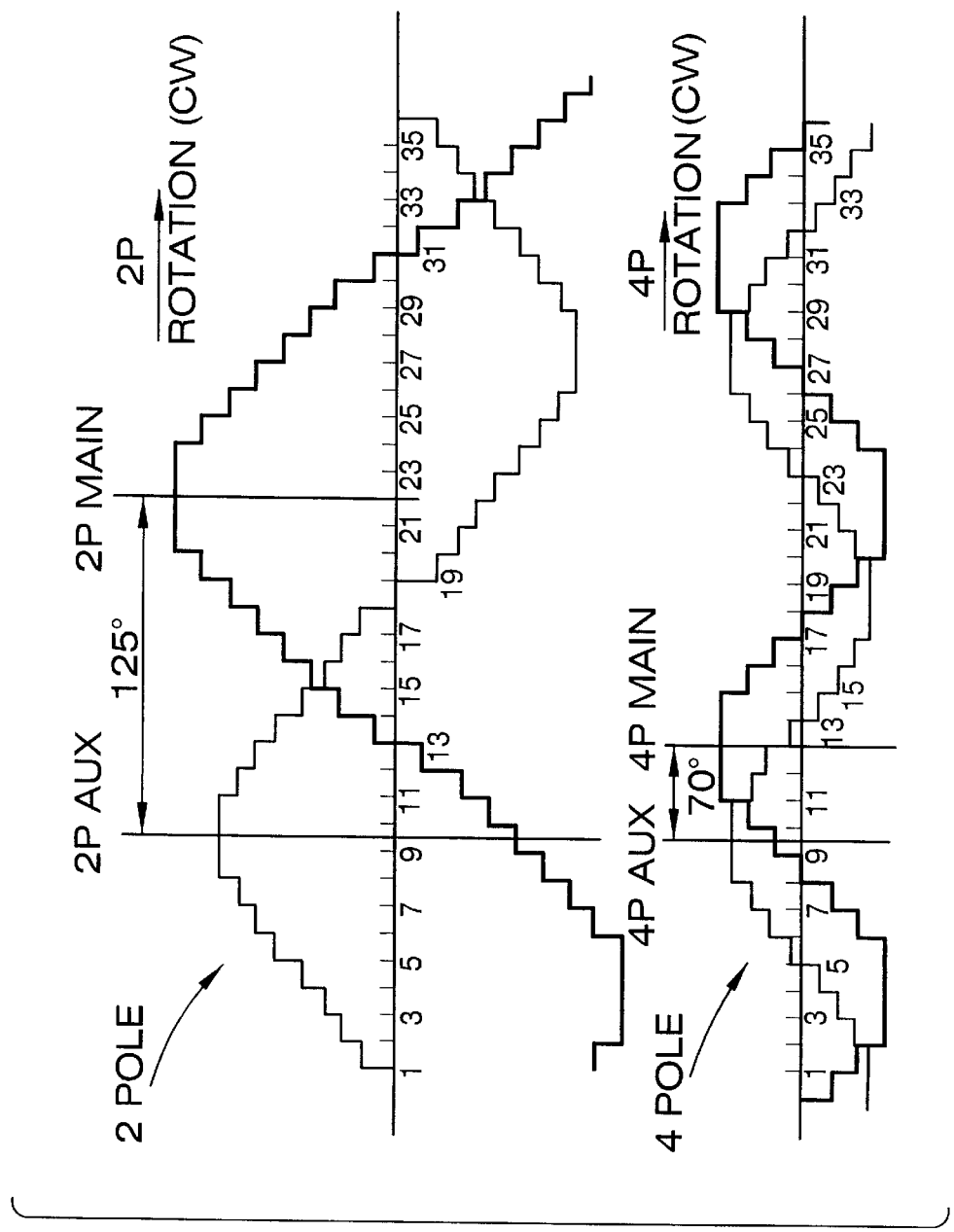
FIG. 4 is a graph illustrating the magnetic motive force of one preferred embodiment of the motor according to the invention with poles along the horizontal x-axis and magnetic motive force (MMF) along the vertical y-axis, the bold lines indicating the main winding MMF.

FIG. 4 is a diagrammatic view of the stator magnetic motive force (MMF) obtainable with 2-pole/4-pole motor operation across a 36 slot stator as illustrated in FIG. 3. As observable in FIG. 4, substantially symmetrical distribution of the MMF is obtained with the motor of this invention. This is accomplished with an economical motor design that can be constructed with conventional motor manufacturing techniques.

Figure 5:
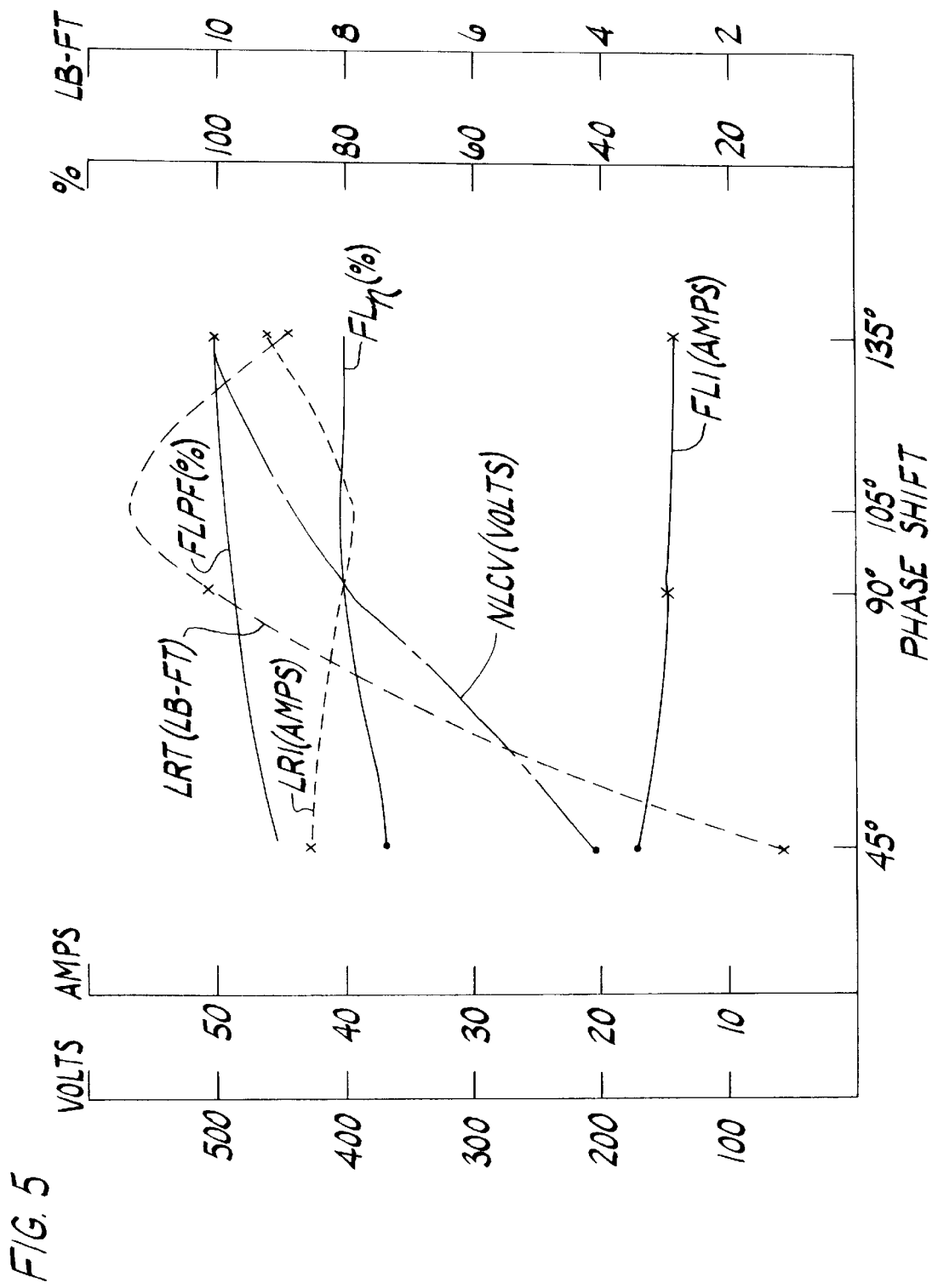
FIG. 5 is a graph illustrating 2-pole performance, with phase angle shift of the auxiliary winding with respect to the main winding plotted along the horizontal x-axis and volts, amps, percentage (%) and pound feet plotted along the vertical y-axis illustrating the locked rotor torque (LRT), locked rotor current (LRI), no-load capacitor volts (NLCV), full load efficiency (FLη), full load power factor (FLPF) and full load current (FLI) for a 2-pole motor.

FIG. 5 is a graph illustrating 2-pole performance, with phase angle shift of the auxiliary winding with respect to the main winding plotted along the horizontal x-axis and volts, amps, percentage (%) and pound feet plotted along the vertical y-axis for a 2-pole motor having a comparable size to the motor of the invention. In particular, the graph illustrates the locked rotor torque (LRT) in pound-feet (lb-ft), locked rotor current (LRI) in amps, no-load capacitor volts (NLCV) in volts, full load efficiency (FLη) in percentage, full load power factor (FLPF) in percentage and full load current (FLI) in amps. It is noted that the locked rotor torque increases to and peaks at a maximum at approximately 105° which, as noted above, is one desired phase shift. The remaining parameters are within acceptable operating ranges.

The invention also includes a method of making a motor comprising the steps of:

providing a stator core;

providing a rotor in rotational relationship with the stator core;

winding a shared main winding on the core having 2-pole and 4-pole configurations; and winding a shared auxiliary winding on the core having 2-pole and 4-pole configurations wherein the shared auxiliary winding is shifted at least one slot less than 90 degrees with respect to the 4-pole shared main winding.

The method further comprises the steps of connecting a capacitor in series with the shared auxiliary winding so that it is energized with the shared auxiliary winding when the shared auxiliary winding is energized with the shared main winding in the 2-pole configuration and connecting the capacitor in series with the shared auxiliary winding so that it is energized with the shared auxiliary winding when the shared auxiliary winding is energized with the shared main winding in the 4-pole configuration.

In general, one goal is to make the phase shift of the auxiliary winding in each pole configuration as close as possible to about 90–105 degrees. The invention accomplishes this in the following manner. The motor is evaluated with various slot shifts of the shared auxiliary winding, each slot shift having a phase shift of about X degrees with respect to the phase of the shared main winding when energized in the 2-pole configuration. The motor is also evaluated with various slot shifts of the shared auxiliary winding, each slot shift having a phase shift of about Y degrees with respect to the phase of the shared main winding when energized in the 4-pole configuration. Then, X and Y are optimized (such as by averaging and/or balancing) to be about 105 degrees. As a result, X and Y are optimized at the one slot shift so that the shared auxiliary winding has a phase shift of about 125 degrees with respect to the phase of the shared main winding when energized in the 2-pole configuration and so that the shared auxiliary winding has a phase shift of about 70 degrees with respect to the phase of the shared main winding when energized in the 4-pole configuration. Also, as a result, the shared auxiliary winding has a phase shift which is not 90 degrees with respect to the phase of the shared main winding when energized in either of the 2 or 4-pole configurations.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A motor comprising:
    a stator core;
    a rotor in rotational relationship with the stator core;
    a shared main winding on the core having 2-pole and 4-pole configurations;
    a shared auxiliary winding on the core having 2-pole and 4-pole configurations; and
    a switching circuit for selectively simultaneously energizing the shared main winding and the shared auxiliary winding in the 2-pole and 4-pole configurations.

2. The motor of claim 1 wherein the shared auxiliary winding comprises a 4-pole auxiliary winding phase shifted at least one slot less than a 90 degree shift with respect to the phase of the shared main winding when energized in the four pole configuration.

3. The motor of claim 2 further comprising a single capacitor connected in series with the shared auxiliary winding and energized with the shared auxiliary winding when the shared auxiliary winding is energized with the shared main winding in the 2-pole configuration and connected in series with the shared auxiliary winding and energized with the shared auxiliary winding when the shared auxiliary winding is energized with the shared main winding in the 4-pole configuration.

4. The motor of claim 2 wherein the stator core has 36 slots and wherein the shared auxiliary winding has a phase shift of about 125 degrees with respect to the phase of the shared main winding when energized in the 2-pole configuration and wherein the shared auxiliary winding has a phase shift of about 70 degrees with respect to the phase of the shared main winding when energized in the 4-pole configuration.

5. The motor of claim 1 wherein the shared auxiliary winding has a phase shift which is not 90 degrees with respect to the phase of the shared main winding when energized in either of the first or second pole configurations.

6. The motor of claim 1 wherein the shared auxiliary winding has a phase shift of about X degrees with respect to the phase of the shared main winding when energized in the 2-pole configuration, wherein the shared auxiliary winding has a phase shift of about Y degrees with respect to the phase of the shared main winding when energized in the 4-pole configuration, and wherein X and Y are made to be as close as possible to about 90–105 degrees.

7. A motor having a 2-pole configuration and a 4-pole configuration comprising:
    a stator core;
    a rotor in rotational relationship with the stator core;
    a shared main winding on the core which, when energized in the 2-pole configuration, generates a first main magnetic field and which, when energized in the 4-pole configuration generates a second main magnetic field different from the first main magnetic field;
    a shared auxiliary winding on the core which, when energized in combination with the shared main winding in the 2-pole configuration, generates a first auxiliary magnetic field and which, when energized in the 4-pole configuration, generates a second auxiliary magnetic field different from the first auxiliary magnetic field; and
    a switching circuit for selectively simultaneously energizing the shared main winding and the shared auxiliary winding in the 2-pole configuration and for selectively simultaneously energizing the shared main winding and the shared auxiliary winding in the 4-pole configuration.

8. The motor of claim 7 wherein the shared auxiliary winding comprises a 4-pole auxiliary winding phase shifted at least one slot less than a 90 degree shift with respect to the phase of the shared main winding when energized in the four pole configuration.

9. The motor of claim 8 further comprising a single capacitor connected in series with the shared auxiliary winding and energized with the shared auxiliary winding when the shared auxiliary winding is energized with the shared main winding in the 2-pole configuration and connected in series with the shared auxiliary winding and energized with the shared auxiliary winding when the shared auxiliary winding is energized with the shared main winding in the 4-pole configuration.

10. The motor of claim 8 wherein the shared auxiliary winding has a phase shift of about 125 degrees with respect to the phase of the shared main winding when energized in the 2-pole configuration and wherein the shared auxiliary winding has a phase shift of about 70 degrees with respect to the phase of the shared main winding when energized in the 4-pole configuration.

11. The motor of claim 7 wherein the shared auxiliary winding has a phase shift which is not 90 degrees with respect to the phase of the shared main winding when energized in either of the first or second pole configurations.

12. The motor of claim 7 wherein the shared auxiliary winding has a phase shift of about X degrees with respect to the phase of the shared main winding when energized in the 2-pole configuration, wherein the shared auxiliary winding has a phase shift of about Y degrees with respect to the phase of the shared main winding when energized in the 4-pole configuration, and wherein X and Y are about 70–125 degrees.

13. A method of making a motor comprising the steps of:
providing a stator core;
providing a rotor in rotational relationship with the stator core;
winding a shared main winding on the core having multiple pole configurations; and
winding a shared auxiliary winding on the core having multiple pole configurations.

14. The method of claim 13 wherein the shared main winding comprises a 2-pole main winding when energized in a first configuration and further comprises a 4-pole main winding when energized in a second configuration, and wherein the shared auxiliary winding is phase shifted at least one slot less than a 90 degree shift with respect to the phase of the shared main winding when energized in the 4-pole configuration.

15. The method of claim 14 further comprising the steps of connecting a single capacitor in series with the shared auxiliary winding so that it is energized with the shared auxiliary winding when the shared auxiliary winding is energized with the shared main winding in the 2-pole configuration and connecting the capacitor in series with the shared auxiliary winding so that it is energized with the shared auxiliary winding when the shared auxiliary winding is energized with the shared main winding in the 4-pole configuration.

16. The method of claim 14 wherein the shared auxiliary winding has a phase shift of about 125 degrees with respect to the phase of the shared main winding when energized in the 2-pole configuration and wherein the shared auxiliary winding has a phase shift of about 70 degrees with respect to the phase of the shared main winding when energized in the 4-pole configuration.

17. The method of claim 14 wherein the shared auxiliary winding has a phase shift which is not 90 degrees with respect to the phase of the shared main winding when energized in either of the 2 or 4-pole configurations.

18. The method of claim 14 wherein the shared auxiliary winding has a phase shift of about X degrees with respect to the phase of the shared main winding when energized in a 2-pole configuration, wherein the shared auxiliary winding has a phase shift of about Y degrees with respect to the phase of the shared main winding when energized in a 4-pole configuration, and further comprising the step of making X and Y to be about 70–125 degrees.

* * * * *